United States Patent
van Vooren et al.

(10) Patent No.: US 9,980,432 B2
(45) Date of Patent: May 29, 2018

(54) HEADER FOR AGRICULTURAL HARVESTER EQUIPPED WITH DUAL CUTTER BAR SYSTEM

(71) Applicant: CNH Industrial America LLC, New Holland, PA (US)

(72) Inventors: Sandor van Vooren, Sijsele-Damme (BE); Stijn Borry, Pittem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/067,505

(22) Filed: Mar. 11, 2016

(65) Prior Publication Data
US 2016/0270291 A1  Sep. 22, 2016

(30) Foreign Application Priority Data

Mar. 20, 2015  (BE) .................... 2015/5163

(51) Int. Cl.
| | |
|---|---|
| *A01D 34/835* | (2006.01) |
| *A01D 34/14* | (2006.01) |
| *A01D 41/14* | (2006.01) |
| *A01D 34/40* | (2006.01) |
| *A01D 69/00* | (2006.01) |
| *A01D 69/03* | (2006.01) |
| *A01D 101/00* | (2006.01) |

(52) U.S. Cl.
CPC ............ *A01D 34/14* (2013.01); *A01D 34/40* (2013.01); *A01D 34/8355* (2013.01); *A01D 41/14* (2013.01); *A01D 69/002* (2013.01); *A01D 69/03* (2013.01); *A01D 2101/00* (2013.01)

(58) Field of Classification Search
CPC ...... A01D 41/14; A01D 47/00; A01D 45/021; A01D 34/8355; A01D 41/141; A01D 34/035; A01D 34/18; A01D 34/30
See application file for complete search history.

(56) References Cited

U.S. PATENT DOCUMENTS

| | | | | |
|---|---|---|---|---|
| 1,905,409 A | * | 4/1933 | Innes .................. | A01D 47/00 56/192 |
| 2,316,475 A | * | 4/1943 | Viken .................. | A01D 57/20 56/181 |

(Continued)

FOREIGN PATENT DOCUMENTS

| | | | | |
|---|---|---|---|---|
| CA | 421751 A | 8/1944 | | |
| CN | 201726680 U | * | 2/2011 | ............ A01D 45/02 |

(Continued)

*Primary Examiner* — Arpad Fabian-Kovacs
(74) *Attorney, Agent, or Firm* — Peter K. Zacharias; Patrick M. Shelddrake

(57) ABSTRACT

A header for a combine harvester has a first cutter bar for cutting crops at a first height so that the cut portions are gathered towards the central area of the header by an auger or draper mechanism, and a second cutter bar configured to cut the remaining stalks of the crops at a second height lower than the first height. The second cutter bar is displaceable with respect to the header body without separating it from the header body, the header body including a header back wall, side walls and floor portion. The second cutter bar is movable to an inactive position. The header is operable with the first cutter bar as a single cutter bar, when the second cutter bar is in the stored position.

5 Claims, 1 Drawing Sheet

(56) References Cited

U.S. PATENT DOCUMENTS

| | | | | | |
|---|---|---|---|---|---|
| 2,338,932 | A | * | 1/1944 | Grant | A01D 43/06 56/185 |
| 2,401,513 | A | * | 6/1946 | Schmidt | A01D 47/00 56/238 |
| 2,750,727 | A | * | 6/1956 | Wright | A01D 41/141 116/DIG. 13 |
| 2,867,962 | A | * | 1/1959 | Meyer | A01D 41/10 56/123 |
| 3,399,517 | A | * | 9/1968 | Magee | A01D 45/021 56/13.9 |
| 3,508,387 | A | * | 4/1970 | Wright | A01D 41/14 56/95 |
| 3,596,448 | A | * | 8/1971 | Van Buskirk | A01D 57/00 56/63 |
| 3,662,525 | A | * | 5/1972 | White | A01D 45/22 56/123 |
| 3,984,966 | A | * | 10/1976 | Outtier | A01D 45/021 56/10.2 R |
| 4,715,174 | A | * | 12/1987 | Lloyd | A01D 41/06 56/189 |
| 4,747,255 | A | * | 5/1988 | Roden | A01D 75/185 56/10.4 |
| 4,910,946 | A | * | 3/1990 | Underwood | A01D 41/148 56/14.4 |
| 5,433,065 | A | * | 7/1995 | Mosby | A01D 41/14 56/13.9 |
| 5,463,857 | A | * | 11/1995 | Blosser | A01D 47/00 56/238 |
| 5,904,032 | A | * | 5/1999 | Rippel | A01D 41/04 460/119 |
| 7,222,474 | B2 | * | 5/2007 | Rayfield | A01D 41/141 56/10.2 E |
| 9,554,510 | B2 | * | 1/2017 | Nurnberg | A01D 34/8355 |
| 2004/0006958 | A1 | * | 1/2004 | Thiemann | A01D 41/141 56/10.2 R |
| 2014/0319253 | A1 | | 10/2014 | Nurnberg et al. | |

FOREIGN PATENT DOCUMENTS

| | | | |
|---|---|---|---|
| DE | 2418995 A1 | 11/1975 | |
| DE | 8524124 U1 | 10/1985 | |
| DE | 3515295 A1 * | 10/1986 | A01D 45/02 |
| DE | 102005025319 A1 | 12/2006 | |
| EP | 0212185 A1 | 3/1987 | |
| EP | 1483953 A1 * | 12/2004 | A01D 41/06 |
| FR | 2730126 A1 | 8/1996 | |
| FR | 2794608 A1 | 12/2000 | |
| WO | 9853660 A1 | 12/1998 | |

* cited by examiner

HEADER FOR AGRICULTURAL HARVESTER EQUIPPED WITH DUAL CUTTER BAR SYSTEM

This application claims priority to Belgium Application BE2015/5163 filed Mar. 20, 2015, which is incorporated herein by reference in its entirety.

FIELD OF THE INVENTION

The present invention is related to agricultural harvesting machines such as combine harvesters. The invention is equally related to headers for use in such harvesting machines.

BACKGROUND OF THE INVENTION

A header for use in a combine harvester includes a cutter bar comprising transversally reciprocating knives for cutting crops at a given height, and an auger or draper mechanism for moving the crops to the centre of the header and from there to the combine's feeder and further on to the crop processing stages in the combine.

In most combines in use today for the harvesting of grain, a single cutter bar is used in the header, cutting the crops at a height of about 10-15 cm from the ground, which means that the grain stalks are harvested together with the grains. The processing of the stalks (threshing, chopping etc), demands a considerable amount of power and negatively affects the capacity of the combine.

One known solution to this problem is the provision of a second cutter bar coupled to the rear of the header and supported by ground engaging roller assemblies, as shown for example in WO-A-2013/011138. This is however quite a complex solution, and the location of the second cutter bar behind the header reduces the available space for using larger wheels and especially tracks on the combine.

WO-A-9853660 shows another header with 2 cutter bars. This solution is however specific for the harvesting of corn, where the stalk portion comprises the valuable crops, and the top portion needs to be prevented from entering the combine. For this reason, the mechanism is very complex involving an upper cutter bar placed forward of the reel and a fixed lower cutter bar. Apart from its complexity, this solution is unsuitable for the harvesting of grain where the top portion of the crop needs to be harvested.

A general problem with any of the existing double cutter bar systems is that the second cutter bar is either a fixed feature of the header or it is described as a modification of an existing header. Switching from a single cutter bar to a double cutter bar therefore requires a replacement of the complete header, or a technical modification of the header, both of which are complex operations.

SUMMARY OF THE INVENTION

The invention is related to a header for an agricultural harvesting machine and to a machine equipped with such a header, as described in the appended claims. The invention is mainly related to a header for a combine harvester having a first cutter bar that functions as in presently known systems, i.e. cutting crops at a first height so that the cut portions are gathered towards the central area of the header by an auger or draper mechanism, and wherein the header comprises a second cutter bar configured to cut the remaining stalks of the crops at a second height lower than the first height, leaving the cut stalks on the ground. The header further comprises a means for displacing the second cutter bar with respect to the header body without separating it from the header body, the header body being defined as the group of components consisting of the header back wall, side walls and floor portion. The displacement means is furthermore configured to store the second cutter bar in a position in which the second cutter bar is incapable of cutting crops. The header is operable with the first cutter bar as a single cutter bar, when the second cutter bar is in the stored position.

The header can thus be used with a single or double cutter bar without requiring replacement or complex modification of the header.

Preferably a compartment is provided in the header in which to store the second cutter bar.

The second cutter bar preferably lies within the footprint of the header body. In this way, the second cutter bar does not form an obstruction for the wheels or tracks of the harvester.

According to a preferred embodiment, the second cutter bar is attached to the ends of support arms oriented perpendicularly to the second cutter bar, the support arms being pivotable about a pivot axis located near the front of the header body, with the arms extending towards the back of the header body.

DETAILED DESCRIPTION OF THE INVENTION

Preferred embodiments will now be described with reference to the drawings. The detailed description is not limiting the scope of the invention, which is defined only by the appended claims. When used in this description, the terms 'front', 'back', 'before' and 'behind' are related to the driving direction of the combine harvester. A cutter bar is a mechanism comprising a row of knives and a row of stationary guards, the knives being configured to make a reciprocating cutting movement with respect to the guards.

Figure 1:
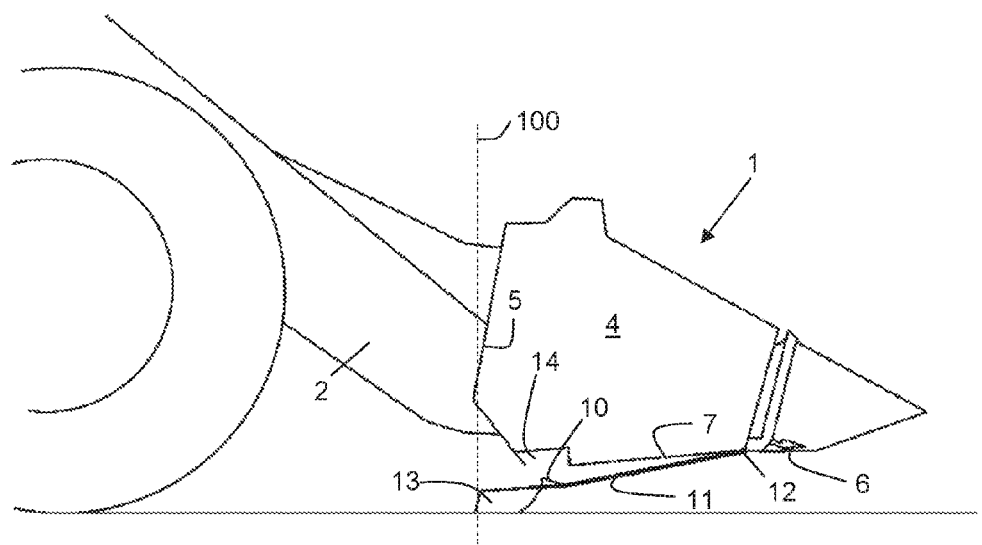
FIG. 1 is a side view of a combine header according to an embodiment of the invention, with the second cutter bar in a first, active position.

FIG. 1 shows a side view of the header 1 of a combine harvester according to a preferred embodiment of the invention. The header 1 is mounted in front of a feeder 2. The assembly of the feeder 2 and the header 1 can be lifted up from the ground by a lifting mechanism (not shown). The header 1 comprises side walls 4, a back wall 5 and a first cutter bar 6. The back wall 5 is interrupted in the center by the discharge opening towards the feeder 2. Behind the first cutter bar 6 and in front of the back wall 5 is the header floor portion 7, schematically shown as a single plane, but referring to the complete set of parts extending between the side walls 4 at the lower side of the header. Mounted above the floor portion 7 and between the side walls 4 may be an auger (not shown), or the header may be a draper header, in which case the floor portion 7 is formed by moving belt systems on either side of the central area of the header. The crops that are cut by the first cutter bar 6 are fed into the combine by the auger or draper action together with the feeder 2. The components described so far are known as such in present day combines and therefore not described in more detail.

A second cutter bar 10 is mounted behind the first one, as seen in the direction of travel of the combine. In the embodiment of FIG. 1, the second bar 10 is attached to a number of support arms 11, which are pivotable about a pivot axis 12 that is essentially parallel to the second cutter bar 10. The pivot axis 12 is located at the front of the header 1, for example directly behind the first cutter bar 6, with the arms 11 extending towards the back of the header 1, the arms being preferably perpendicular to the pivot axis. For example 4 or 5 support arms may be provided, evenly spread across the width of the header. Glide plates 13 are removably attached to the ends of the support arms 11 or to the second cutter bar 10 itself, in order to maintain the second cutter bar 10 at a given height, while the combine moves forward. When the height of the header 1 is adjusted with the lifting mechanism, the glide plates 13 remain on the ground level through rotation of the support arms 11 about the pivot axis 12, and the second cutter bar 10 thereby remains at a constant height. Instead of glide plates 13, a set of wheels could be used.

In the position shown in FIG. 1, the second cutter bar 10 is closer to the ground level than the first cutter bar 6. This position allows to cut grain stalks at a higher level by the first cutter bar 6, thereby taking in a lower volume of stalks compared to the single cutter bar system, while the second cutter bar 10 cuts off the remaining stalks at the normal level (e.g. 10-15 cm). The stalks cut by the second cutter bar 10 are not harvested and will normally remain on the ground.

Figure 2:
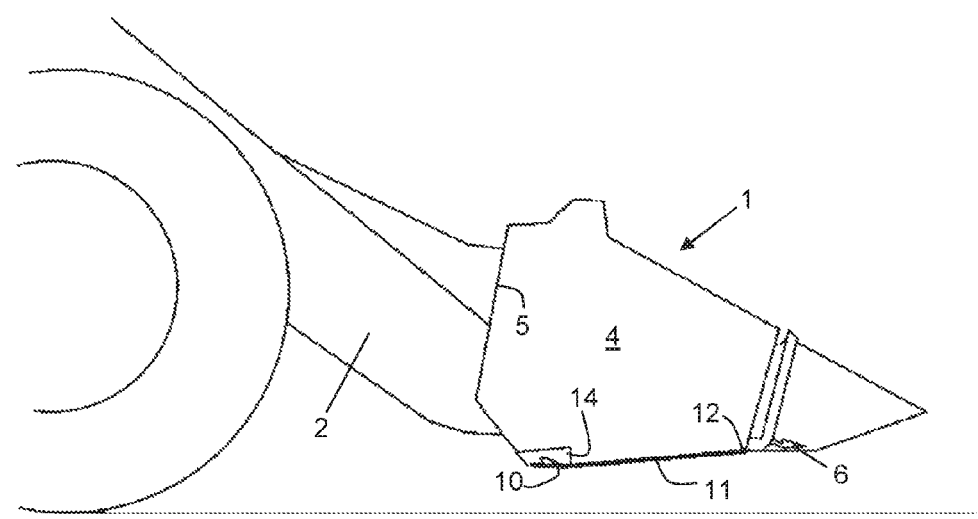
FIG. 2 is a side view of a combine header according to the same embodiment as FIG. 1, with the second cutter bar in the stored position.

According to the invention, the second cutter bar 10 can be stored in a position wherein it is inactive, i.e. incapable of cutting crops. While the second bar is stored in the inactive position, the header 1 is operable with the first cutter bar 6 acting as the single cutter bar. This is illustrated in FIG. 2, where the second cutter bar 10 is stored in a compartment formed by a recess 14 at the underside of the header 1. The glide plates have been removed and the arms 11 together with the second cutter bar 10 are locked in their position as shown. A suitable locking mechanism (not shown) is provided for this purpose, for example a set of actuatable locking pins mounted in the side walls of the header, for locking the second cutter bar directly, and/or locking pins in the vicinity of the support arms 11, configured to lock the support arms directly.

For the embodiment of FIGS. 1 and 2, the stored position of the second cutter bar 10 is reached by lowering the header 1 (by means of the header lifting mechanism) until the second cutter bar 10 reaches the compartment 14, after which it is locked in place. After removal of the glide plates 13, the header 1 is ready for use as a single cutter bar header. In order to change back to a double cutter bar, the second cutter bar 10 is released, the header 1 is lifted and the glide plates 13 are mounted again, at which point the second cutter bar 10 is again operable. In this way the header 1 can be transformed easily into a single cutter bar header or a double cutter bar header according to circumstances, and without requiring replacement or complex modifications of the header.

In the embodiment of FIGS. 1 and 2, the means for displacing and storing the second cutter bar 10 consist of the pivotable support arms 11 and the fact that a suitable compartment 14 is provided in which the second cutter bar is stored so that it is not capable of cutting crops. The rotation of the support arms 11 with respect to the header body is not actuated actively and the storing of the second cutter bar 10 takes place by lowering the header while the second bar is on the ground, until the second cutter bar 10 reaches the storing position 14. Other embodiments may include active displacement systems wherein the second bar is actively moved into the storing position. Alternative displacement systems may also be applied instead of the pivotable support arms 11, for example by attaching the second cutter bar 10 to the ends of variable length actuators attached to the header body. The stored position does not necessarily require a storing compartment for the second cutter bar. What counts is that the second bar is incapable of cutting crops when it is in the stored position. The cutting action of the second cutter bar may continue when the second cutter bar is in the stored position, or it may be interrupted once the second bar reaches the stored position.

According to preferred embodiments, the second cutter bar 10 lies substantially within the footprint of the header body, meaning that the second cutter bar is preferably within said footprint, and does not extend away from said footprint (i.e. beyond the plane 100 in FIG. 1), to a degree that it forms a meaningful obstruction for the front wheels or tracks of the harvester, in the area behind the header body. This means that the header can be used with any size and type of wheels or tracks.

The harvester according to the invention comprises a drive mechanism for driving the reciprocal movement of the knives of the second cutter bar 10. Preferably the drive mechanism is capable of remaining active while the second cutter bar is displaced towards the stored position and while the second bar is stored in said position. In the embodiment of FIGS. 1 and 2, a known driver system sometimes referred to as a sickle drive may be mounted on the second cutter bar 10 at one lateral end thereof. The sickle drive may be coupled to the header's existing main power shaft or to an additional power shaft (hereafter referred to as a power take-off shaft or PTO) coming from the combine, via a gearbox and a telescopic PTO. This telescopic PTO may be integrated in the side wall of the header. Instead of through a telescopic PTO, the sickle drive may be driven through a belt drive with the driven wheel mounted on the second cutter bar and the driving wheel mounted on the header body, and provided with a tensioning means that enables the belt to remain under tension when the second cutter bar moves with respect to header body. As an alternative to either the telescopic PTO or the belt system, the cutting action of the second cutter bar may be driven by a hydraulic motor.

The invention claimed is:

1. A header for an agricultural harvesting machine, comprising:
   a header body comprising a back wall, a pair of side walls, and a floor portion extending between the pair of side walls and in front of the back wall;
   a first cutter bar mounted to the header body and configured for cutting a crop at a first height;
   a movable support moveably coupled to the header body; and
   a second cutter bar located forward of the back wall of the header body and coupled to the movable support, the second cutter bar configured for cutting a remaining portion of the crop at a second height that is lower than the first height,
   wherein the movable support is configured to displace the second cutter bar with respect to the header body without separating the second cutter bar from the header body such that the second cutter bar is moveable to be stored in a stored position in which the second cutter bar is incapable of cutting the remaining portion of the crop, and further in which the header is operable with the first cutter bar as a single cutter bar.

2. The header according to claim 1, further comprising a compartment at an underside of the header body for storing the second cutter bar in the stored position.

3. The header according to claim 1, wherein the movable support comprises a plurality of support arms carrying the second cutter bar, the plurality of support arms being pivotable about a pivot axis located forward of the second cutter bar, each of the plurality of support arms extending rearwardly from the pivot axis.

4. The header according to claim 1, wherein the second cutter bar lies substantially within a footprint of the header body.

5. The header according to claim 1, wherein the header is configured to be mounted to a feeder of the agricultural harvesting machine.

* * * * *